United States Patent
Rusten

(10) Patent No.: US 10,515,024 B2
(45) Date of Patent: Dec. 24, 2019

(54) EVENT GENERATING UNIT

(71) Applicant: Nordic Semiconductor ASA, Trondheim (NO)

(72) Inventor: Joar Olai Rusten, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 64 days.

(21) Appl. No.: 15/578,665

(22) PCT Filed: May 6, 2016

(86) PCT No.: PCT/GB2016/051310
§ 371 (c)(1),
(2) Date: Nov. 30, 2017

(87) PCT Pub. No.: WO2016/203193
PCT Pub. Date: Dec. 22, 2016

(65) Prior Publication Data
US 2018/0217947 A1 Aug. 2, 2018

(30) Foreign Application Priority Data

Jun. 16, 2015 (GB) .................................. 1510597.6

(51) Int. Cl.
G06F 13/26 (2006.01)
G06F 13/10 (2006.01)
G06F 9/54 (2006.01)

(52) U.S. Cl.
CPC ............ G06F 13/102 (2013.01); G06F 9/542 (2013.01); G06F 13/26 (2013.01)

(58) Field of Classification Search
CPC ........ G06F 13/102; G06F 9/542; G06F 13/24; G06F 13/26
See application file for complete search history.

(56) References Cited

U.S. PATENT DOCUMENTS 5,579,531 A 11/1996 Sugita
6,243,785 B1 6/2001 Lowe et al.
(Continued)

FOREIGN PATENT DOCUMENTS

DE 3632139 A1 4/1988
EP 0738978 A1 4/1996
(Continued)

OTHER PUBLICATIONS

Atmel | Smart Arm-based Flash MCU, SAM4C Series, Datasheet, Mar. 27, 2015, pp. 1-5 and 473-482 of 1296 pages.
(Continued)

Primary Examiner — Tim T Vo
Assistant Examiner — Harry Z Wang
(74) Attorney, Agent, or Firm — Klarquist Sparkman, LLP

(57) ABSTRACT

A microcontroller (2) has a processor (6), peripherals (18, 20, 22, 24, 26), a programmable peripheral interconnect (PPI) (10), an event-generating unit (EGU) (17), and a memory (8). The peripherals respond to task signals from the PPI. The EGU responds to a predetermined change to the contents of an event-generating register (57, 59) by signalling an event to the PPI. Stored PPI mappings can map an EGU event to a task of one of the peripherals. Mappings from one EGU event to two or more peripheral tasks cause the PPI to respond to an event signal from the EGU by sending the respective task signals within a maximum time limit. Software in the memory comprises instructions to store such mappings in a mapping memory, and to make the predetermined change to the contents of the event-generating register. In another aspect, an interrupt-generating unit (17) is arranged to send an interrupt to the processor (6) in response to receiving a task signal from the PPI (10).

17 Claims, 5 Drawing Sheets

(56) References Cited

U.S. PATENT DOCUMENTS

| | | | |
|---|---|---|---|
| 9,087,051 | B2 | 7/2015 | Elahi et al. |
| 2005/0251640 | A1* | 11/2005 | Wheeler ............... G06F 9/4411 711/170 |
| 2008/0221708 | A1 | 9/2008 | Oyama et al. |
| 2008/0258760 | A1 | 10/2008 | Sullam et al. |
| 2009/0318078 | A1 | 12/2009 | Girard et al. |
| 2011/0197003 | A1* | 8/2011 | Serebrin ............ G06F 9/45558 710/267 |
| 2011/0289242 | A1* | 11/2011 | Srinivasan ............ G06F 13/102 710/22 |
| 2012/0239826 | A1 | 9/2012 | Couvee et al. |
| 2014/0304439 | A1* | 10/2014 | Elahi ....................... G06F 13/24 710/51 |
| 2016/0147679 | A1* | 5/2016 | Guddeti .................. G06F 13/24 710/269 |
| 2016/0267030 | A1 | 9/2016 | Stapleton |

FOREIGN PATENT DOCUMENTS

| | | |
|---|---|---|
| EP | 0811922 A1 | 4/1997 |
| EP | 1988460 A1 | 4/2008 |
| FR | 2953307 A1 | 12/2009 |
| GB | 2497528 A | 6/2013 |
| WO | WO 2001/96979 A2 | 12/2001 |
| WO | WO 2002/054212 A2 | 7/2002 |
| WO | WO 2009/077341 A1 | 6/2009 |
| WO | WO 2011/045678 A1 | 4/2011 |
| WO | WO 2011/067507 A1 | 6/2011 |
| WO | WO 2013/088121 A1 | 6/2013 |
| WO | WO 2015/097426 A1 | 7/2015 |

OTHER PUBLICATIONS

Atmel, SAM4C Series Datasheet, Atmel-1102F-ATARM-SAM4C16-SAM4C4-Datasheet—Mar. 27, 2015, 1296 pages.

Atmel, 8-bit AVR Microcontrollers, Application Note, AVR1001: Getting Started with XMEGA Event System, Atmel-8bit_AVR-Microcontrollers: AVR1001: Getting Started with XMEGA Event System, Rev. 8071A-AVR-02/08, 8 pages.

Energy Micro, EFM32 Peripherals, http://www.engerymicro.com/technology/efm32-peripherals, 2 pages.

Energy Micro, Peripheral Reflex System, AN0025—Application Note; Oct. 21, 2011—an0025_Rev1.02, 17 pages.

Lee, et al., Zikimi: A Case Study in Micro Kernel Design for Multimedia Applications, Multimedia Tools and Applications, 27, 351-366, 2005, 16 pages.

Nordic Semiconductor, nRF51 Series Reference Manual, Version 1.1, Mar. 8, 2013, 175 pages.

PCT International Search Report and Written Opinion for PCT/GB2016/051310, Jul. 26, 2016, 11 pages.

\* cited by examiner

| Mapping # | Event Register | Task Register |
|---|---|---|
| 1 | 0x100 | 0x500 |
| 2 | 0x300 | 0x620 |
| 3 | ⋮ | ⋮ |
| ⋮ | ⋮ | ⋮ |

Figure 2

EVENT GENERATING UNIT

CROSS REFERENCE TO RELATED APPLICATIONS

This is the U.S. National Stage of International Application No. PCT/GB2016/051310, filed May 6, 2016, which was published in English under PCT Article 21(2), which in turn claims the benefit of Great Britain Application No. 1510597.6 filed Jun. 16, 2015.

This invention relates to a microcontroller.

Microcontrollers are often used in applications where timing is important, such as in radio devices. There are situations where it can be important that two tasks involving one or more peripherals are initiated by a processor on a microcontroller essentially simultaneously. The device may, for example, need to initiate communication over a serial interface and start a timer at precisely the same time. This would ordinarily be done by instructing the processor to initiate a first one of the tasks and then immediately instructing it to initiate the other task. However, even if these are carried out using adjacent software instructions, it is still possible that the processor might receive an interrupt after triggering the first task, but before triggering the second task. This can lead to undesirable behaviour.

This problem can be mitigated to an extent by masking certain interrupts at critical times, or by setting different priorities on different interrupts. However, neither of these approaches is perfect, and they also introduce additional complexity to the software.

The present invention provides an alternative approach.

From a first aspect, the invention provides a microcontroller comprising:
a processor;
a plurality of peripherals;
a programmable peripheral interconnect;
an event-generating unit; and
a memory, storing software,
wherein:
the event-generating unit comprises an event-generating register, addressable by the processor;
the event-generating unit is connected to the programmable peripheral interconnect; and
the event-generating unit is arranged to detect a predetermined change to the contents of the event-generating register and, in response to detecting such a predetermined change, to signal an event to the programmable peripheral interconnect;
each of the peripherals is connected to the programmable peripheral interconnect;
each of the peripherals is configured to respond to a task signal from the programmable peripheral interconnect by performing a respective task;
the programmable peripheral interconnect is configured to access a mapping memory in which a plurality of mappings can be stored, each mapping an event of the event-generating unit to a task of one of the peripherals;
the programmable peripheral interconnect is configured so that, when a mapping is stored in the mapping memory from an event of the event-generating unit to a task of one of the peripherals, the programmable peripheral interconnect will respond to a signal of the event from the event-generating unit by sending a task signal to the peripheral;
the programmable peripheral interconnect is configured so that, when the mapping memory stores mappings from one event of the event-generating unit to two or more different tasks, the programmable peripheral interconnect will send the two or more respective task signals within a predetermined maximum time from receiving a signal of the event; and
the software comprises instructions, executable by the processor, to (i) store, in the mapping memory, mappings from one event of the event-generating unit to at least two different peripheral tasks, and (ii) make said predetermined change to the contents of the event-generating register.

Thus it will be seen by those skilled in the art that, in accordance with the invention, the software, when executed, causes two or more peripheral tasks to be triggered atomically, and within a predetermined maximum time frame. Because only a single processor write instruction is used to initiate the peripheral tasks, there is no risk of the triggering of the two tasks being interrupted by a processor interrupt.

The predetermined maximum time may have any value, but is preferably 10 microseconds or less; more preferably 1 microsecond or less; and most preferably 0.1 microsecond or less. It is preferably sufficiently low that two or more tasks can be regarded, for practical purposes, as being triggered simultaneously. The predetermined maximum time may be less than 100 processor clock cycles; more preferably, it may less than 10 or 5 clock cycles. In some embodiments, it may be less than one processor clock cycle. The predetermined maximum time is preferably constant for all mappings. Preferably, the programmable peripheral interconnect is arranged to send the two or more respective task signals simultaneously (e.g., to within one cycle of a clock signal provided to the programmable peripheral interconnect or provided to the processor). In this case, there is preferably a constant time delay between the programmable peripheral interface receiving a signal of an event and sending two or more task signals that are mapped to the event, for all possible mappings.

Programmable peripheral interconnects are already known—for example, as described in WO 2013/088121 by the present applicant. In some preferred embodiments, the programmable peripheral interconnects is substantially the same as a programmable peripheral interconnect described in WO 2013/088121, the entire contents of which are incorporated herein by reference, although this is not essential.

The programmable peripheral interconnect preferably also supports the programming of peripheral-to-peripheral channels. In some embodiments, the microcontroller also comprises one or more peripherals that are event-generating, being configured to signal an event to the programmable peripheral interconnect (PPI). The programmable peripheral interconnect is preferably arranged so that a mapping can be stored between an event of a first peripheral and a task of a second peripheral, and so that, when a mapping is stored in memory between an event of a first peripheral and a task of a second peripheral, the interconnect will provide a channel by sending a task signal to the second peripheral in response to a signal of the event from the first peripheral. In this way, the programmable peripheral interconnect may conveniently interface with the event-generating unit in the same way as it interfaces with an event-generating peripheral. In some embodiments, the event-generating unit may be regarded as a type of event-generating peripheral.

The peripherals are not limited to any particular type, and may include such peripherals as: a timer, a UART, a voltage comparator, an encryption engine, an analogue-to-digital converter (ADC), a digital-to-analogue converter (DAC), a radio transmitter, a radio receiver, and so on. An event may be signalled from a peripheral in response to any input, change of state, satisfying of a criterion, etc., as will be familiar to one skilled in the art—for example, when a timer reaches a target value. The tasks may be any function or operation which can be performed by the peripheral, such as transmitting data over an interface.

The event-generating unit may be arranged to signal only a single type of event, but it is preferably able to signal a plurality of different events. These may be signalled over different respective event lines, or using different respective event registers. The event-generating unit may have a plurality of event-generating registers, addressable by the processor. Each event-generating register may be associated with a different respective event. The different events can preferably be identified uniquely in a stored mapping—for example, by using the address of the event-generating register as an identifier, or by using some other predetermined set of identifiers.

It will be appreciated that, unlike a conventional peripheral, where events signify some change of state in the peripheral (e.g., the completion of some operation), an event from the event-generating unit has no intrinsic meaning, but is instead given significance by the processor (or other component) that causes it, by writing to the event-generating register.

The PPI may be connected to the peripherals and/or the event-generating unit by respective lines for each event and task over which event and task signals can be sent; i.e. one line for each event or task. The signals may be pulses or encoded values. Incoming lines may connect to one or more multiplexers within the PPI; e.g. with one multiplexer for each channel. Outgoing lines may leave from one or more demultiplexers within the PPI; e.g. with one demultiplexer for each channel. The PPI may be configured to set or control a multiplexer and a demultiplexer of a channel in accordance with a mapping stored in memory.

In some embodiments, the PPI may access the task registers or event registers, or both, of peripherals and/or the event-generating unit over a bus, e.g. over an address bus using memory-mapped input/output (MMIO). The PPI may thus receive an event signal through a change in the contents of the associated event register and/or may send a task signal by changing the contents of the associated task register. The PPI may be connected to a bus (e.g. a system bus which may comprise an address bus, data bus and control bus) to which the processor is also connected. The same bus may connect the peripherals and/or the event-generating unit to the processor. The PPI may detect a change in the contents of an event register by reading the event register at intervals; e.g. regular polling; or by receiving an interrupt from the event-generating peripheral or the event-generating unit. On receiving an interrupt, the PPI may then read the contents of a corresponding event register.

An event register or task register may contain a single bit (i.e. for signaling a flag or binary signal), or it may comprise a plurality of bits, e.g. 8, 16 or 32 bits.

The event-generating unit may signal an event to the programmable peripheral interconnect (PPI) over an event signal line. Alternatively, it may signal the event through a change to a register, in which case the PPI may be configured to poll the register at intervals in order to detect the change. This register may be the event-generating register itself, or a separate event register for the event-generating unit.

In some embodiments, the identification of a task in a mapping is the address of a task register, associated with the task, as described in WO 2013/088121. However, this is not essential, and the identification of a task of a task-receiving peripheral could, for example, comprise (i) a peripheral-identifier and (ii) a task-identifier or signal-line-identifier, unrelated to the address of any associated task register (which may or may not be present on the peripheral).

A task-receiving peripheral may comprise a task register, addressable by the processor, associated with a task, and be configured to perform that task in response to a change in the contents of the task register. A mapping between an event of a first peripheral and a task of a second peripheral may then comprise (i) an identification of the event of the first peripheral, and (ii) the address of a task register associated with the task. The PPI may be configured so that, when a mapping is stored in memory between an event of a first peripheral and a task of a second peripheral, the interconnect will provide a channel by sending a task signal to the second peripheral in response to a signal of the event from the first peripheral.

An event-generating peripheral may comprise an event register, addressable by the processor, associated with an event. While the event register may be located immediately adjacent logic associated with the peripheral on an integrated circuit, this is not essential and it may be situated some distance away from other elements of the peripheral; the same is true for the task register. The registers may comprise any suitable memory structure. The peripheral may change the contents of the event register when signaling an event; for example, by writing a binary '1' to the event register whenever it signals an event.

In some embodiments, the identification of an event of a first peripheral in a mapping is the address of an event register associated with the event. In this way, a channel can be configured simply by storing two register addresses in memory: an event-register address and a task-register address. Software running on the processor might do this via a function call or might write the addresses directly to the memory where the mapping is stored. This is not essential, however, and the identification of the event of the first peripheral could comprise a peripheral identifier and an event or signal line identifier, unrelated to the address of any associated event register which may or may not be present.

The event-generating unit preferably comprises at least one event register, addressable by the processor, associated with an event of the event-generating unit. In some embodiments the event-generating register is the event register. In other embodiments, the event register is separate (i.e. has a different address) from the event-generating register. The unit may be configured so that a predetermined change to the event-generating register may cause a predetermined change to the event register. The event-generating register may, in some embodiments, be a task register for the event-generating unit. The event-generating unit may comprise a plurality of event-generating registers and a plurality of event registers. Each event-generating register may be associated with a respective one of the event registers, such that a change to one of the event-generating registers causes a change to an associated one of the event registers.

The event-generating unit may comprise logic that associates two or more event-generating registers with one event—e.g., requiring predetermined changes in two different event-generating registers, possibly in a predetermined order, before signaling a particular event. In other words, the event-generating unit may comprise logic for sending an event signal when, or only when, a criterion relating to two or more event-generating registers is met. Such logic may be fixed (i.e., hard-wired), or it may be programmable.

In some embodiments, the event-generating unit is able to receive a task signal from the programmable peripheral interconnect (e.g. over a task line, or by way of a change to the contents of the event-generating register), and to respond by signaling an event to the programmable peripheral interconnect. This may be useful if the event-generating unit is also configured to send interrupts to the processor when signaling an event, as explained in more detail below.

An event of the event-generating unit may be identified in a mapping in the same way as an event of an event-generating peripheral is identified—e.g. by the address of an associated event register, or by some other identifier unique to the event.

The PPI is programmable in the sense that it can be programmed or configured to define connections between peripherals using one or more mappings. The PPI need not necessarily comprise its own a processing unit for executing software instructions, although it may do so.

A mapping in the mapping memory may take any suitable form. In some embodiments, the address of an event register and the address of a task register, or pointers to these registers, may be stored as related entries in an array, table or database. For example, the PPI may maintain a table having a number of rows, each corresponding to a different channel, and two columns, the first for identifying an event register and the second for identifying a task register. It will be appreciated such an array or table can be a logical construct and need not necessarily be limited to any particular physical locations of the data in memory. The PPI may comprise a first set of registers for storing task-register addresses and a second set of registers for storing event-register addresses. There may be an equal number of registers in each set. A register in the first set may control a multiplexer which is connected to a demultiplexer controlled by a corresponding register in the second set, thereby defining a channel.

The memory may be separate from the PPI, e.g. in a separate region of silicon or on a different chip, but is preferably an integrated component of the PPI, which can reduce access times. The memory may be volatile (e.g. RAM) or non-volatile (e.g. EEPROM or flash). The mappings are preferably stored in one or more registers which are preferably addressable by the processor. Each channel provided by the PPI may have one associated event end-point register and one associated task end-point register, which may be suitable for storing an address of an event register and an address of a task register respectively. Some of the channels may use these registers to store other types of event and/or task identifiers.

The mapping or mappings may be written to the memory by the PPI or by the processor, or by both. The processor may indirectly establish a channel between peripherals by instructing the PPI to store the appropriate mapping.

The PPI preferably comprises, or can access, one or more lookup tables which it can use to look up a register address from a mapping in order to determine a particular event line or task line (or event port or task port) corresponding to that register address. It may then select the line or port as input or output for a channel (e.g. by controlling a multiplexer or demultiplexer appropriately). The lookup table may take any suitable form, and need not necessarily be implemented as a physical table in memory.

The PPI may support any number of channels; e.g. 1, 8, 16, 32 or more. A channel can be any physical (e.g. electrical) or logical connection between an event input port or line to the PPI and a task output port or line from the PPI. A channel may link one or more inputs to one or more outputs (e.g. using logic gates to define branches or forks along the channel path).

The PPI preferably comprises a mechanism for allowing a channel to be enabled and/or disabled. The PPI may comprise a bit-field register, having one bit associated with each channel, and be configured so that a channel is enabled if its associated bit in the bit-field register is set to a predetermined value (e.g. a binary 1).

An event-generating peripheral may have more than one event register. Similarly, a task-receiving peripheral may have more than one task register.

As already explained, the PPI is configurable to respond to one event signal by sending two or more task signals, potentially to different task-receiving peripherals. In some embodiments this may be accomplished by storing a plurality of mapping relations in the mapping memory, each mapping the event (e.g., identified by an event register address) to a different respective task (e.g., identified by respective task register addresses). In other embodiments, it may be accomplished by storing a single mapping relation which maps one event to two or more tasks directly; e.g. by having a table stored in the mapping memory comprising three or more columns, one for the event, and two or more further columns for respective tasks.

The event-generating unit preferably has no outputs other than one or more event lines to the PPI, zero or more interrupt lines to the processor, and zero or more registers. It preferably has no inputs other than a clock input, one or more registers, and zero or more task lines. The event-generating unit is typically much simpler than a conventional peripheral. It is preferably smaller than any other peripheral on the microcontroller, in terms of its number of components or its number of gates. It preferably has no timing mechanism (unlike a timer peripheral). It preferably has no data input mechanism, other than zero or more event registers, task registers and configuration registers (unlike a serial interface, or digital-to-analogue converter, for example, which have connections for receiving and transmitting arbitrary data to other components or devices).

The event-generating unit may comprise circuitry for sending an interrupt to the processor when signaling an event. The interrupt may be a maskable interrupt or a non-maskable interrupt. It may have an input for enabling and/or disabling the sending of an interrupt to the processor when signaling a particular event. The event-generating unit may comprise one or more configuration registers for configuring the event-generating unit to send an interrupt to the processor when it detects a change to the contents of the event-generating register. The unit may comprise separate configuration registers for configuring maskable and non-maskable interrupts respectively.

The ability to send an interrupt to the processor is particularly useful when the event-generating unit comprises an input for receiving a task signal from the programmable peripheral interface. This then allows the programmable peripheral interface to be programmed so that an event on a peripheral can cause the event-generating unit to send an interrupt to the processor. This can be useful if the peripheral is not capable of sending an interrupt itself, or if the peripheral has been assigned only a limited number of interrupts (e.g., one interrupt), meaning that all interrupts from the peripheral must be processed in a limited number of interrupt service routines (e.g., one interrupt service routine). By using the PPI and the event-generating unit to send an interrupt to the processor instead, the peripheral can effectively increase the number of different interrupts (e.g.

with different interrupt numbers) that it can cause to be sent to the processor. This can simplify the programming of the interrupt service routine. It can also, for processors that support interrupts at different priority levels, enable a peripheral to interrupt the processor at a plurality of different interrupt levels, which may greater than the number of interrupt levels that were accessible to the peripheral without using the event-generating unit.

For example, a peripheral might have one event called "NEWVALUE" that occurs every 100 us, and another event called "ERROR" which it signals only when something goes wrong. The peripheral might, however, only have one interrupt line to the processor, and so be unable to interrupt at a higher priority for the "ERROR" event. However, by configuring a PPI channel between the peripheral and the event-generating unit so that a signal of the "ERROR" event from the peripheral will cause the PPI to activate a task line on the event-generating unit, and by setting the event-generating unit to send a high-priority interrupt to the processor when it receives a signal over that task line, the peripheral can be provided with the capacity to send an "ERROR" interrupt to the processor at high priority. This can enable the processor to respond quickly to the "ERROR" event.

In some embodiments, the microcontroller may comprise a plurality of event-generating units, each connected to the processor by a set of interrupt lines, each set having a different respective interrupt priority level. Alternatively, one event-generating unit may have one or more tasks (or events) which can be used to send an interrupt at a first priority level, and one or more other tasks (or events) which can be used to send an interrupt at a second priority level. The association between the tasks (or events) and the interrupt priority levels may be fixed or may be configurable (e.g., according to one or more register values on the event-generating unit).

This idea of using a unit connected to the programmable peripheral interconnect to generate processor interrupts is novel and inventive in its own right and thus, from a further aspect, the invention provides a microcontroller comprising:
a processor;
a plurality of peripherals;
a programmable peripheral interconnect; and
an interrupt-generating unit,
wherein:
an event-generating one of the peripherals is configured to signal an event to the programmable peripheral interconnect;
the interrupt-generating unit is arranged to send an interrupt to the processor in response to receiving a task signal from the programmable peripheral interconnect;
the programmable peripheral interconnect is configured to access a memory in which a mapping can be stored between (i) an event of a first peripheral and (ii) a task of the interrupt-generating unit or of a second peripheral; and
the programmable peripheral interconnect is configured so that, when a mapping is stored in memory between an event of a first peripheral and a task of the interrupt-generating unit, the programmable peripheral interconnect will respond to a signal of the event from the first peripheral by sending a task signal for the task to the interrupt-generating unit.

Any feature of any of the preceding aspect and embodiments may be a feature of this aspect also. In particular, the interrupt-generating unit may be an event-generating unit. It may therefore be arranged to detect a predetermined change to the contents of an event-generating register and, in response to detecting such a predetermined change, to signal an event to the programmable peripheral interconnect. It may be an event-generating unit as previously described. The interrupt-generating unit may have any of the features of the event-generating units described herein. The programmable peripheral interconnect (PPI) may have any of the features of the PPIs described previously.

The interrupt-generating unit may be connected to the programmable peripheral interconnect by a task line, and may send the task signal over the task line.

Alternatively, it may write to a task register, which is monitored by the programmable peripheral interconnect.

The event-generating peripheral may be configured to signal an event to the programmable peripheral interconnect over an event line. Alternatively, it may write to an event register, which is monitored by the programmable peripheral interconnect.

The interrupt-generating unit is preferably arranged to send the interrupt in direct response to receiving a task signal—preferably within a predetermined maximum time from receiving the task signal, or at a constant time delay after receiving a task signal.

The microcontroller may comprise a memory storing software, the software comprising instructions, executable by the processor, to store, in the mapping memory, a mapping from an event of the event-generating peripheral to a task of the interrupt-generating unit.

In any of the aspects, although the event-generating register or registers are said to be part of the event-generating unit, it will be appreciated that this does not limit their physical location on the microcontroller. The event-generating registers are preferably addressable by the processor, e.g. over the bus. They can preferably be written to and/or read from by the processor. Each event-generating register may occupy a contiguous region of memory, or it may be split across a plurality of locations. A register, as referred to herein, may be only a single bit long (possibly within a larger bit field), or it may comprise a plurality of bits (e.g. a 32-bit word).

The microcontroller preferably comprises volatile and/or non-volatile memory, such as RAM and/or flash memory. A part of the memory may store program code.

The processor may be any suitable processor. In some embodiments it is a processor from ARM™, such as a processor from ARM™—s Cortex™ range. The microcontroller may comprise a plurality of buses, such as a processor bus and a peripheral bus. The event-generating unit is preferably connected to one or more buses.

The microcontroller is preferably an integrated device, although it may, of course, require some off-chip components, such as a crystal, capacitors, etc., in order to operate. These components may be regarded as part of the microcontroller, or they may be regarded as distinct from the microcontroller.

The interrupt- or event-generating unit is preferably a separate hardware module in the microcontroller, distinct from the processor. The interrupt- or event-generating unit may comprise analogue and/or digital components, including transistors, resistors, capacitors, etc., arranged to provide the functions described herein. The microcontroller may, of course, have other peripherals that are not connected to the programmable peripheral interconnect by a task line or that are not connected by an event line.

In some embodiments, the microcontroller comprises a radio transceiver. It may be a radio-on-a-chip device.

Certain preferred embodiments of the invention will now be described, by way of example only, with reference to the accompanying drawings, in which:

FIG. 2 is a table representing a memory structure storing mappings between peripheral registers;

Figure 1:
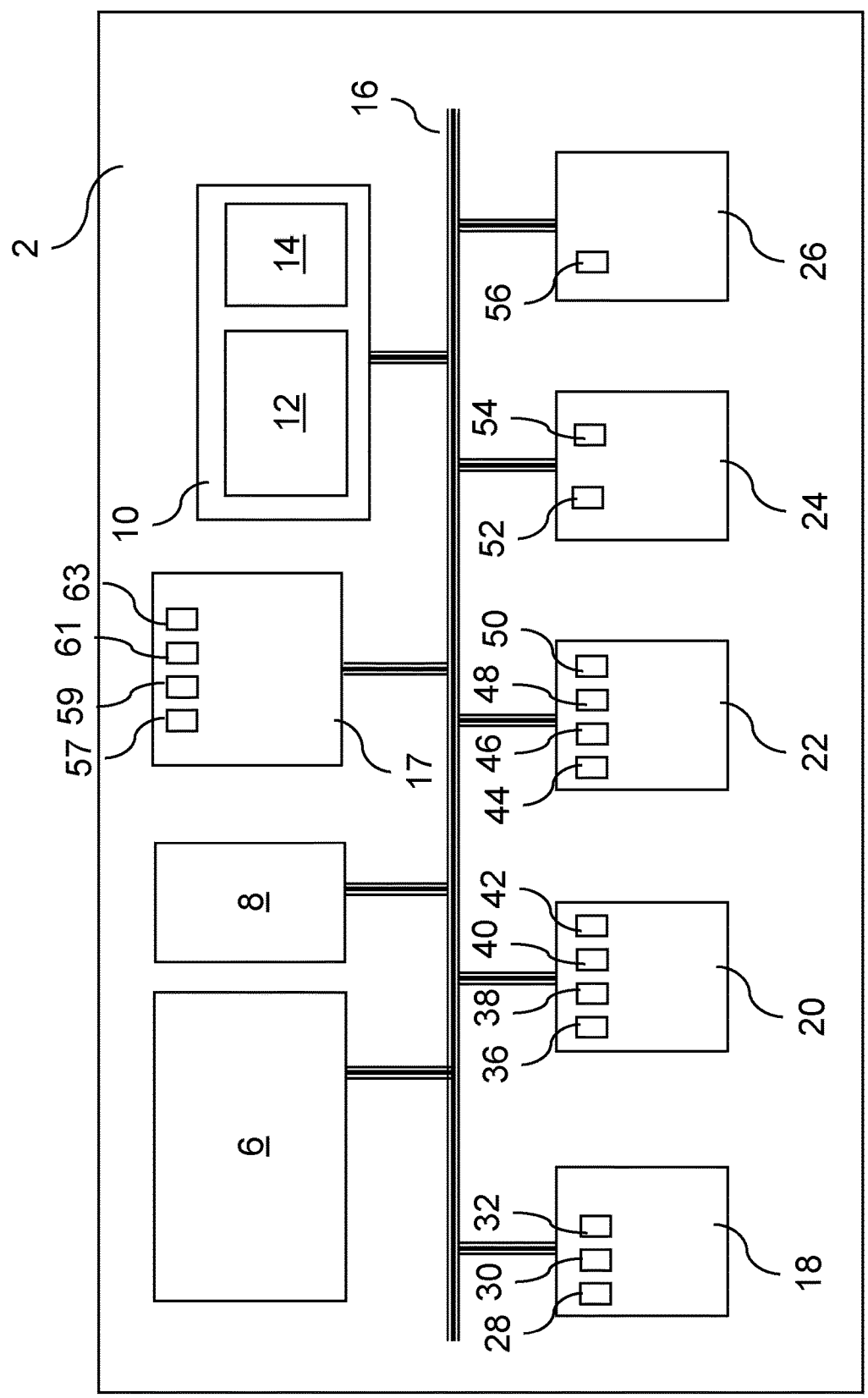
FIG. 1 is a schematic drawing showing components of a first system embodying the invention.

FIG. 1 shows a microcontroller (MCU) 2 (e.g. an integrated circuit or a multi-chip module) which includes a central processing unit (CPU) 6, a main memory 8, and a PPI 10, having a logic area 12 and an internal memory 14. The CPU 6 and PPI 10 are both connected to a bus 16.

Also connected to the bus 16 are an event-generating unit 17 and five exemplary peripherals: a timer 18, a digital-to-analogue converter (DAC) 20, a UART 22, a hardware encryption engine 24, a voltage comparator 26.

The timer 18 has an output event register 28, an overflow event register 30 and an input task registers 32. The DAC 20 has two conversion-finished event registers 36, 38 and two trigger task registers 40, 42. The UART 22 has an RX received event register 44, a TX complete event register 46, an RX trigger task register 48 and a TX trigger task register 50. The hardware encryption engine 24 has an encryption-finished event register 52 and a trigger task register 54, while the voltage comparator 26 has a single comparator output event register 56. Some of the registers are single-bit registers, while others can hold a multi-bit value. Of course, other embodiments may have different peripherals, and the peripherals may have any number of event or task registers.

The event-generating unit 17 has a first event register 57, a second event register 59, a first task register 61 and a second task register 63. Of course, other embodiments may have different numbers of event or task registers. In this embodiment, the event-generating unit 17 is arranged so that the first task triggers the first event, and so that the second task triggers the second event. In other embodiments, there may be more complex logic mapping task to events.

The registers of the peripherals 18-26 and the event-generating unit 17 share a memory addressing space with the main memory 8 and the PPI memory 14, so that they can be accessed using memory-mapped I/O by the PPI logic 12 and optionally by the CPU 6.

The bus 16 may be a single bus, as shown, or it may be formed from two or more separate buses.

In use, the CPU 6 might, for example, instruct the PPI 10 to create a channel connecting one of the DAC 20 conversion-finished events to the UART 22 trigger task, so that the UART 22 transmits data after a DAC conversion has completed. On receiving this instruction, the PPI 10 creates a new entry in a table held in its memory 14, linking the address of the DAC 20 conversion-finished register 36 and the address of the UART 22 trigger task register 48.

The CPU 6 might also, for example, instruct the PPI 10 to create a channel connecting the first event register 57 of the event-generating unit 17 to the TX trigger task register 50 of the UART 22, and another channel connecting the same first event register 57 of the event-generating unit 17 to an input task register 32 of the timer 18. In this way, the CPU 6 can start the timer 18 at the same time as the UART 22 starts a transmission by writing a '1' bit to the first task register 61 of the event-generating unit 17. This process is atomic—i.e. it won't by interrupted by a CPU 6 interrupt.

FIG. 2 shows an exemplary logical data structure which may be stored in the PPI's memory 14. It has a number of rows, each of which contains a mapping number, an event register address and a task register address.

The PPI logic 12 is configured to poll every event register listed in the table periodically, to determine when a value in the register changes. When a change is detected, the PPI logic 12 writes the new value (or a predetermined value, such as a binary '1') to all task registers which are mapped to the particular event register in the table.

The PPI logic 12 may optionally be configured to perform some processing on a new value in the event register and instead write a result of the processing to one or more of the task registers. For example, if the event register contains a multi-bit value, the PPI logic 12 might determine whether it is higher than the previous value and write a one bit to a single-bit task register in accordance with a mapping in the memory 14. The PPI 10 could be instructed as to what processing (if any) to perform by the CPU 6. The type of processing may be stored as a further column in the mapping table.

If the CPU 6 wants to deactivate a channel, it can do this straightforwardly by causing the relevant entry in the table stored in the PPI's memory 14 to be erased. It does not need to instruct the peripherals directly (although it may of course also do this, in some circumstances).

Figure 3:
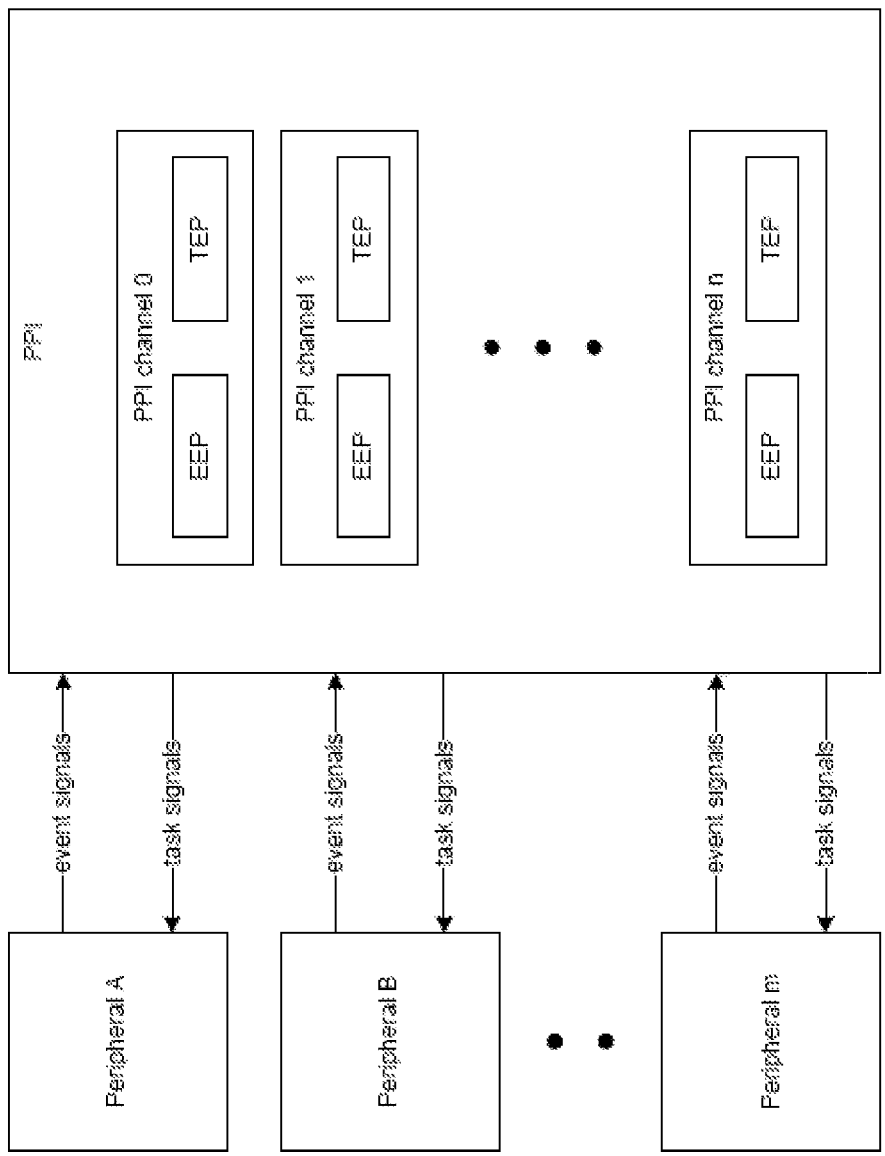
FIG. 3 is a schematic drawing of several peripherals connected to a PPI in a second system embodying the invention.
Figure 4:
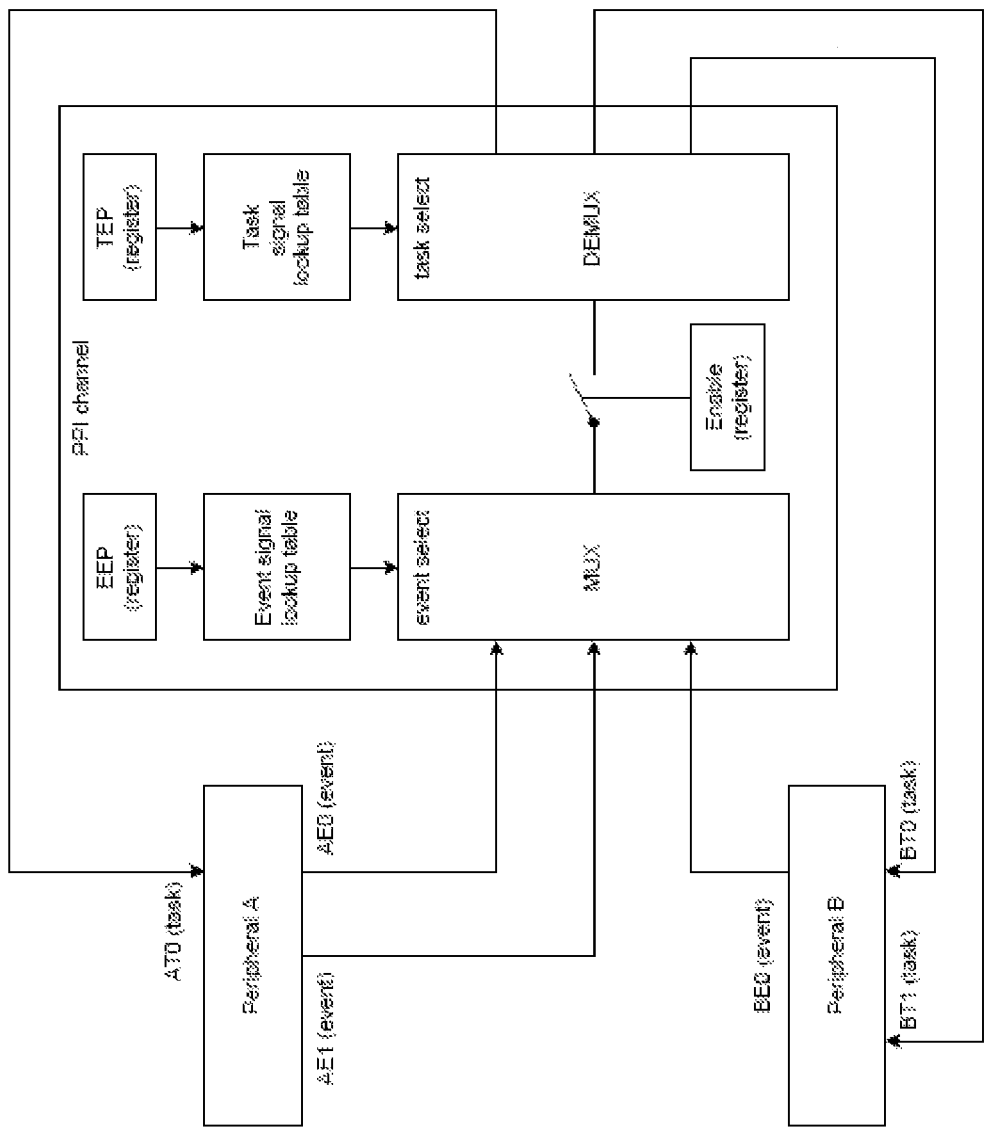
FIG. 4 is a schematic drawing of elements relating to a particular channel within the PPI.
Figure 5:
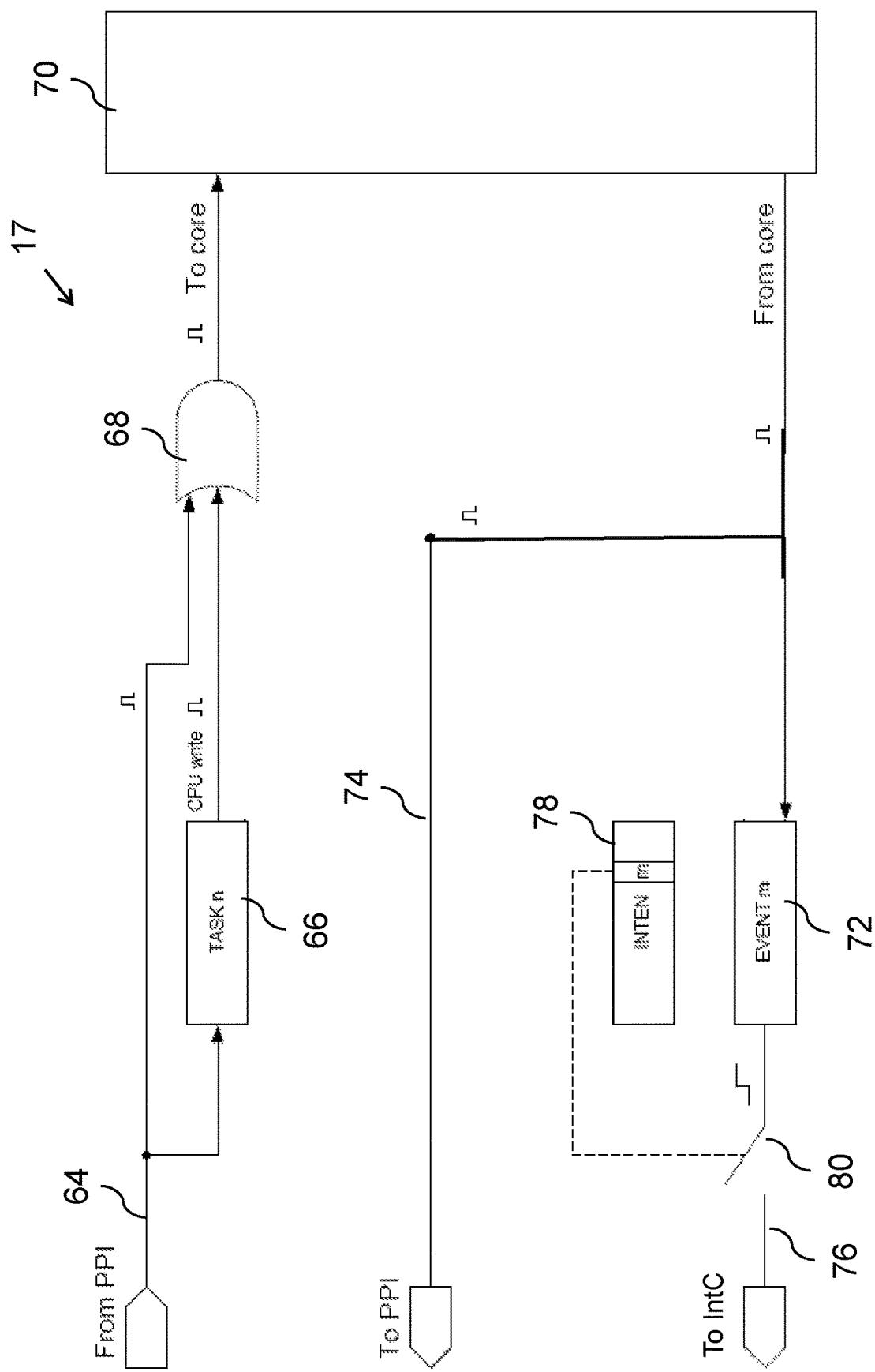
FIG. 5 is a schematic drawing showing an event-generating unit.

FIGS. 3-5 relate to a set of embodiments in which the PPI 10 is connected to the peripherals 18-26 and the event-generating unit 17 by individual lines for each respective event and task signal. This may be done as an alternative to using the memory-mapped input/output as described above, or the MCU 2 might support both modes of communication (e.g., to allow the CPU 6 to interact with the peripherals via registers, and to allow the PPI 10 to interact with the peripherals via dedicated lines).

FIG. 3 shows m peripherals which are connected to a PPI (which may be the same PPI 10 as above, or a different PPI). The event-generating unit 17 can be regarded as another peripheral for these purposes. The PPI provides n channels, each of which has an associated event end-point register (EEP) and task end-point register (TEP). Each of these registers can hold the address of a register on one of the peripherals.

FIG. 4 provides more detail of elements associated with one of these n channels. Each of the channels has a similar set of elements. The channel's EEP is connected to an event signal lookup table which cross-references a set of peripheral event register addresses with an internal event line identifier which relates to one of the inputs to a multiplexer (MUX) in the PPI, associated with the channel. The PPI is configured to set the MUX to select the input associated with the address contained in the EEP.

Similarly, the channel's TEP is connected to a task signal lookup table which cross-references a set of peripheral task register addresses with an internal task line identifier which relates to one of the output of a demultiplexer (DEMUX) in the PPI, associated with the channel. The PPI is configured to set the DEMUX to select the output associated with the address contained in the TEP Two peripherals A, B are connected to the channel's MUX. One of these may be an event-generating unit. Peripheral A can provide two event signals AE0, AE1, each of which has its own line into the MUX. Peripheral B can provide a single event signal BE0 which also has a line into the MUX. Similar lines will connect to the multiplexers of the other n-1 channels (not shown).

The channel's DEMUX is connected to three output lines, one leading to a task input AT0 on peripheral A and two leading to different task inputs BT0, BT1 on peripheral B.

Within the PPI, the output from the MUX is connected through a switch to the input to the DEMUX. The connection is made when the switch is closed, so that an event signal (e.g. a pulse) from one of the peripheral selected by the MUX is passed to the DEMUX and thence on to a selected task input of one of the peripherals. The switch's state is controlled by a register, writable to by a CPU (not shown).

In some alternative arrangements, one channel may have multiple demultiplexers, each connected to the output of the channel's MUX. In this way, a single event can be forked so as to trigger a plurality of peripheral tasks.

The PPI is arranged to issue task signals within a predetermined maximum time from receiving an incoming event channel. In some embodiments, this time delay is constant for all channels. Signals on different or forked channels are handled in parallel.

FIG. 5 figuratively illustrates the internals of the event-generating unit 17.

For a particular task n, the event-generating unit 17 is connected to the PPI 10 by an input task line 64 along which a task signal can be sent to trigger the task n. The event-generating unit 17 also has a task register 66 associated with the task n which sends a signal to trigger the task if firmware running on the CPU 6 writes a binary '1' to the task register 66. The contents of the task register 66 may also be updated automatically by the event-generating unit 17 when the PPI sends a task signal over the task line 64. The task line 64 from the PPI and an output indicating the state of the task register 66 are combined in a logical OR gate 68 and sent to the core 70 of the event-generating unit 17.

In a straightforward embodiment, the core 70 simply connects each task n with a respective event n in a one-to-one mapping. In more complex embodiments, the core 70 may include logic which associates one or more tasks to one or more events—for example, requiring both "task 1" and "task 2" to be triggered, in that order, before signaling "event 1".

The core 70 can output an event signal for an event m. This causes the contents of an associated event register 72 to change to indicate that an event has been signalled (e.g., by changing the contents of a single-bit register from a binary '0' to a binary '1'). The same event signal is also split and sent to the PPI 10 over event output line 74.

This change to the event register 72 can also be configured to cause a signal to be sent over an interrupt signal line 76 to an interrupt controller in the CPU 6. Whether or not this interrupt signal is sent depends on the state of an interrupt-enable register 78, which can be written to by the CPU 6. If a binary '1' has been written in a bit position corresponding to the event n then the switch 80 is closed and the interrupt signal will be sent.

The CPU 6 can use the event-generating unit 17, in combination with the PPI 10, in a number of different ways.

For example, the CPU 6 may configure the PPI 10 to trigger two or more peripheral tasks in response to receiving a signal for an event n from the event-generating unit 17. The CPU 6 can then write a '1' bit to the task register 66 on the event-generating unit 17, which will cause the event-generating unit 17 to send an event signal to the PPI 10 over the nth event signal line 74. The PPI 10 will then trigger all of the tasks simultaneously and atomically.

In another example, the CPU 6 may activate the mth interrupt signal line 76, and may create a mapping for the PPI 10 that establishes a channel from an event of a peripheral to the mth input task line to the event-generating unit 17. The peripheral can then cause an interrupt to be sent to the CPU 6 by signaling the event to the PPI 10 over the appropriate event line connecting the peripheral to the PPI 10. In this way, the peripheral may be able to interrupt the CPU 6 at a different priority from a priority assigned to its own interrupt line to the CPU 6.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A microcontroller comprising:
a processor;
a plurality of peripherals;
a programmable peripheral interconnect;
an event-generating unit; and
a memory, storing software,
wherein:
the event-generating unit comprises an event-generating register, addressable by the processor;
the event-generating unit is connected to the programmable peripheral interconnect; and
the event-generating unit is arranged to detect a predetermined change to the contents of the event-generating register and, in response to detecting such a predetermined change, to signal an event to the programmable peripheral interconnect;
each of the peripherals is connected to the programmable peripheral interconnect;
each of the peripherals is configured to respond to a task signal from the programmable peripheral interconnect by performing a respective task;
the programmable peripheral interconnect is configured to access a mapping memory in which a plurality of mappings can be stored, each mapping an event of the event-generating unit to a task of one of the peripherals;
the programmable peripheral interconnect is configured so that, when a mapping is stored in the mapping memory from an event of the event-generating unit to a task of one of the peripherals, the programmable peripheral interconnect will respond to a signal of the event from the event-generating unit by sending a task signal to the peripheral;
the programmable peripheral interconnect is configured so that, when the mapping memory stores mappings from one event of the event-generating unit to two or more different tasks, the programmable peripheral interconnect will send the two or more respective task signals within a predetermined maximum time from receiving a signal of the event; and
the software comprises instructions, executable by the processor, to (i) store, in the mapping memory, mappings from one event of the event-generating unit to at least two different peripheral tasks, and (ii) make said predetermined change to the contents of the event-generating register.

2. The microcontroller of claim 1, wherein the predetermined maximum time is 10 microseconds or less.

3. The microcontroller of claim 1, wherein the programmable peripheral interconnect is arranged to send the two or more respective task signals simultaneously.

4. The microcontroller of claim 3, wherein there is a constant time delay between the programmable peripheral interface receiving a signal of an event and sending two or more task signals that are mapped to the event, for all possible mappings.

5. The microcontroller of claim 1, comprising one or more peripherals that are event-generating, being configured to signal an event to the programmable peripheral interconnect, wherein the programmable peripheral interconnect is arranged so that, when a mapping is stored in the mapping memory between an event of a first peripheral and a task of a second peripheral, the programmable peripheral interconnect will provide a channel by sending a task signal to the second peripheral in response to a signal of the event from the first peripheral.

6. The microcontroller of claim 1, wherein the event-generating unit is arranged to signal a plurality of different events.

7. The microcontroller of claim 6, wherein the event-generating unit has a plurality of event-generating registers, addressable by the processor, wherein each event-generating register is associated with a different respective event.

8. The microcontroller of claim 1, wherein the event-generating unit is able to receive a task signal from the programmable peripheral interconnect.

9. The microcontroller of claim 1, wherein the programmable peripheral interface is connected to the peripherals and to the event-generating unit by respective lines for each event and task.

10. The microcontroller of claim 1, wherein the programmable peripheral interface comprises at least one event register, addressable by the processor, associated with an event of the event-generating unit.

11. The microcontroller of claim 10, wherein the event register is separate from the event-generating register and wherein the event-generating unit is configured so that a predetermined change to the contents of the event-generating register will cause a predetermined change to the contents of the event register.

12. The microcontroller of claim 1, wherein the event-generating unit comprises a plurality of event-generating registers and a plurality of event registers, wherein each event-generating register is associated with a respective one of the event registers, such that a change to one of the event-generating registers causes a change to an associated one of the event registers.

13. The microcontroller of claim 10, wherein the event-generating register is the event register.

14. The microcontroller of claim 1, wherein the event-generating unit has no outputs other than one or more event lines to the PPI; zero or more interrupt lines to the processor; and zero or more registers.

15. The microcontroller of claim 1, wherein the event-generating unit has no inputs other than a clock input, one or more registers, and zero or more task lines.

16. The microcontroller of claim 1, comprising circuitry for sending an interrupt to the processor when signalling an event.

17. The microcontroller of claim 1, comprising a plurality of event-generating units, each connected to the processor by a set of interrupt lines, each set of interrupt lines having a different respective interrupt priority level.

* * * * *